(12) United States Patent
Sawada et al.

(10) Patent No.: US 6,823,694 B2
(45) Date of Patent: Nov. 30, 2004

(54) METHOD OF MANUFACTURING GLASS OPTICAL ELEMENTS

(75) Inventors: Hiroyuki Sawada, Akishima (JP); Yoshitaka Goto, Fussa (JP); Yuka Miyashita, Kamiinagun (JP)

(73) Assignee: Hoya Corporation, Tokyo (JP)

( * ) Notice: Subject to any disclaimer, the term of this patent is extended or adjusted under 35 U.S.C. 154(b) by 146 days.

(21) Appl. No.: 09/942,669

(22) Filed: Aug. 31, 2001

(65) Prior Publication Data

US 2002/0059812 A1 May 23, 2002

(30) Foreign Application Priority Data

Sep. 1, 2000 (JP) ........................................ 2000-265293

(51) Int. Cl.⁷ ............................................. C03B 11/12
(52) U.S. Cl. ................................. 65/85; 65/83; 65/102; 65/137; 65/318; 65/319; 65/356
(58) Field of Search ............................. 65/29.15, 29.21, 65/37, 66, 83, 85, 102, 137, 162, 306, 318, 319, 356; 425/808

(56) References Cited

U.S. PATENT DOCUMENTS 5,228,894 A * 7/1993 Sato et al. ..................... 65/102
6,105,395 A * 8/2000 Yoshida et al. ................ 65/102
6,568,220 B1 * 5/2003 Paek et al. ..................... 65/392

FOREIGN PATENT DOCUMENTS

| JP | 63-310735 | * | 12/1988 |
| JP | 2579036 | | 2/1992 |
| JP | 04-046024 | * | 2/1992 |
| JP | 8-133767 | | 5/1996 |
| JP | 08-133767 | * | 5/1996 |

* cited by examiner

*Primary Examiner*—Sean Vincent
(74) *Attorney, Agent, or Firm*—Oblon, Spivak, McClelland, Maier & Neustadt, P.C.

(57) ABSTRACT

A method for manufacturing a glass optical element having at least one concave surface, including: softening a glass molding material by heating, molding the softened material with a first mold having a first molding surface and a second mold having a second molding surface by applying a pressure, the first molding surface including a first concave forming surface, the second molding surface including a convex forming surface, a planar forming surface or a second concave forming surface, the second concave forming surface having a curvature radius greater than that of the first concave forming surface, whereby the applying of the pressure starts when the first mold and the second mold are at temperatures above a glass transition temperature of said glass molding material, the glass material is cooled so that a temperature of the glass material reaches a temperature equal to or lower than a glass transition temperature (Tg) of the glass material, and the cooled glass material is removed from either of the first mold or the second mold. A second temperature of the second mold reaches the glass transition temperature prior to a time when a first temperature of first mold reaches the glass transition temperature in the cooling step.

24 Claims, 13 Drawing Sheets

*FIG. 1(A)*

$b/a \geqq 1.5$

*FIG. 1(B)*

$b/a \geqq 1.5$

*FIG. 1(C)*

$b/a \geqq 1.5$

SURFACE PRECISION OF LENSES

EXAMPLE 1

EXAMPLE 2

EXAMPLE 3

COMPARATIVE EXAMPLE 1

COMPARATIVE EXAMPLE 2

METHOD OF MANUFACTURING GLASS OPTICAL ELEMENTS

FIELD OF THE INVENTION

The present invention relates to a method of manufacturing glass optical elements for molding with high surface precision lenses, for example, in which one or both surfaces are concave and have a ratio b/a of the peripheral thickness b to the center thickness a of at least 1.5.

BACKGROUND OF THE INVENTION

Methods in which softened glass is pressed with a mold having the shape of the product or similar to that of the product to directly manufacture lenses without grinding or polishing (precision pressing methods) are widely utilized. Precision pressing is employed to manufacture the optical system lenses of a variety of optical equipment and products such as digital cameras and video cameras. In precision pressing, the molding surface of the mold must be transferred to the glass as precisely as possible.

However, in lenses in which one or both surfaces are concave, even though molding surfaces are transferred to the glass, the glass sometimes moves back in the direction of one of the surfaces while solidifying, or a transferred surface that has been molded deteriorates, sometimes precluding adequate surface precision. This tendency is marked in the molding of lenses with a ratio b/a of the peripheral thickness b to the center thickness a of at least 1.5.

SUMMARY OF THE INVENTION

Accordingly, an object of the present invention is to provide a method of manufacturing glass optical elements permitting the molding of lenses that are concave on one or both surfaces with high surface precision.

Research conducted by the present inventors resulted in the discovery that the above-stated problem was solved, in the case of a lens with one concave surface, by delaying cooling of the concave surface relative to cooling of the surface (flat or convex) on the opposite side, and in the case of lenses with two concave surfaces, by delaying cooling of the concave surface with the smaller radius of curvature relative to cooling of the concave surface on the opposite side with the larger radius of curvature.

The present invention relates to a method for manufacturing a glass optical element having at least one concave surface, including:

softening a glass molding material by heating, molding the softened material with a first mold having a first molding surface and a second mold having a second molding surface by applying a pressure, the first molding surface includes a first concave forming surface, the second molding surface includes a convex forming surface, a planar forming surface or a second concave forming surface, the second concave forming surface having a curvature radius greater than that of the first concave forming surface, whereby shapes of the first molding surface and the second molding surface are transferred to the material, cooling the material so that a temperature of the material reaches a temperature equal to or lower than glass transition temperature (Tg), and removing the cooled material from either of the first mold or the second mold, where in the cooling step, a second temperature of the second mold reaches the glass transition temperature prior to a time when a first temperature of the first mold reaches the glass transition temperature.

In a preferred embodiment of the present invention, one of either the first mold or the second mold comprises an upper mold, and the other comprises a lower mold; and said first mold preferably comprises an upper mold and said second mold preferably comprises a lower mold; and when the second temperature reaches the glass transition temperature, the first temperature is preferably at least 5 degree centigrade higher than the glass transition temperature.

One of the embodiments of the present manufacturing method (Manufacturing Method 1) is that for glass optical elements, in which one optically functional surface is concave, and includes:

softening a glass molding material by heating press-molding the heat-softened glass molding material with a forming mold including an upper mold and a lower mold with molding surfaces for forming the optically functional surfaces of the glass optical element to be molded, one of these molding surfaces being a concave forming surface and the other being a convex forming surface or a flat forming surface, thereby transferring shapes of the molding surfaces to the glass material being molded;

cooling the forming mold to cool the molded glass to a temperature equal to or lower than the glass transition temperature (Tg) of the glass; and removing the cooled glass from the forming mold;

where the cooling is conducted such that the temperature ta2 of the mold with the convex forming or flat forming molding surface reaches Tg before the temperature ta1 of the mold with the concave forming molding surface.

The second embodiment of the present manufacturing method (Manufacturing Method 2) is that for glass optical elements in which both optically functional surfaces are concave, including:

softening a glass molding material by heating press-molding the heat-softened glass molding material with a forming mold including an upper mold and a lower mold with molding surfaces for forming the optically functional surfaces of the glass optical element to be molded, both of these molding surfaces being concave forming surfaces. thereby transferring shapes of the molding surfaces to the glass material being molded;

cooling the forming mold to cool the molded glass to a temperature equal to or lower than the glass transition temperature (Tg) of the glass; and removing the cooled glass from the forming mold;

where the cooling is conducted such that the temperature tb2 of the mold with molding surface having the larger radius of curvature reaches Tg before the temperature tb1 of the mold with the molding surface having the smaller radius of curvature.

The present invention is described in detail below.

The glass optical element that is manufactured in the manufacturing method of the present invention may be, for example, a lens with one or two concave surfaces. Specifically, the manufacturing method of the present invention is suited to lenses in which the ratio b/a of the peripheral thickness b to the center thickness a is 1.5 or greater.

Figure 1A:
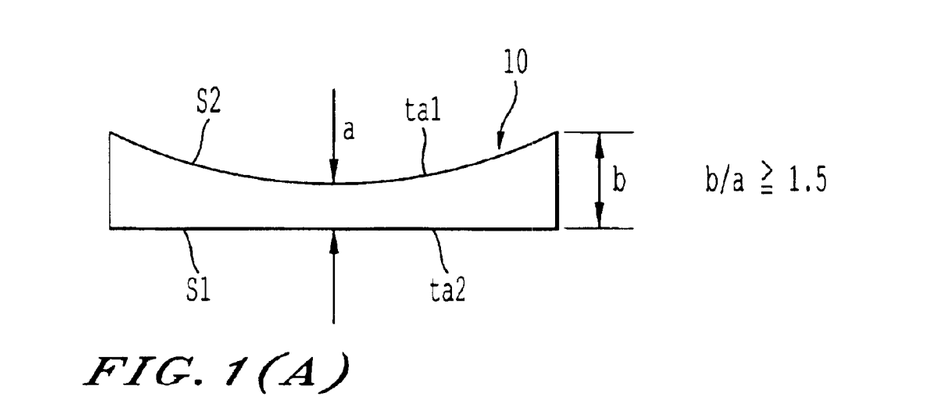
FIGS. 1(A)–1(C) show glass optical elements that are manufactured by the method of the present invention.
Figure 1B:
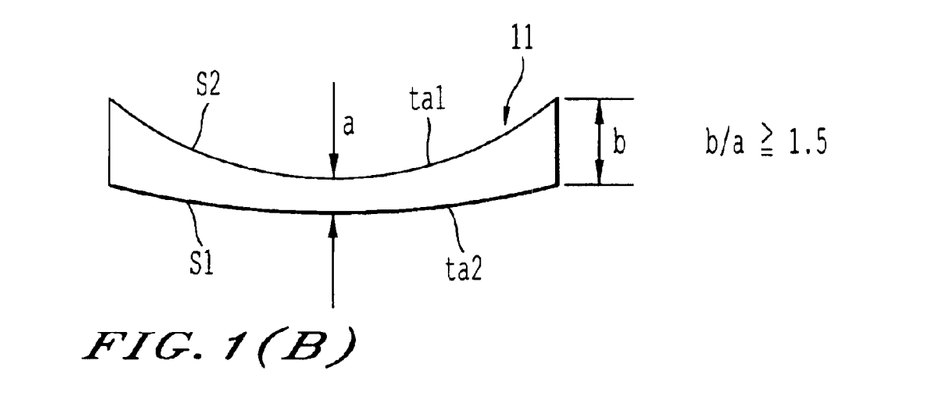
Figure 1C:
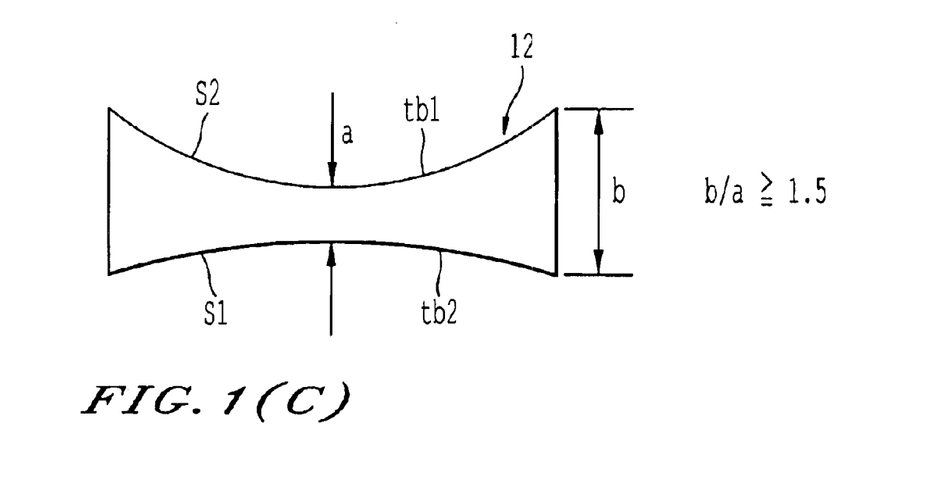

FIG. 1 shows an example of such a lens. In the lens 10 shown in FIG. 1(A), one surface S2 is concave and the other surface S1 is flat. In the lens 11 shown in FIG. 1(B), one surface S2 is concave and the other surface S1 is convex. In the lens 12 shown in FIG. 1(C), both surfaces S1 and S2 are concave. However, the concave radius of curvature R of surface S1 is larger than the concave radius of curvature R of surface S2. In lenses (A) to (C), the ratio b/a, the ratio of the peripheral thickness b to the center thickness a can be made not less than 1.5.

Figure 2:
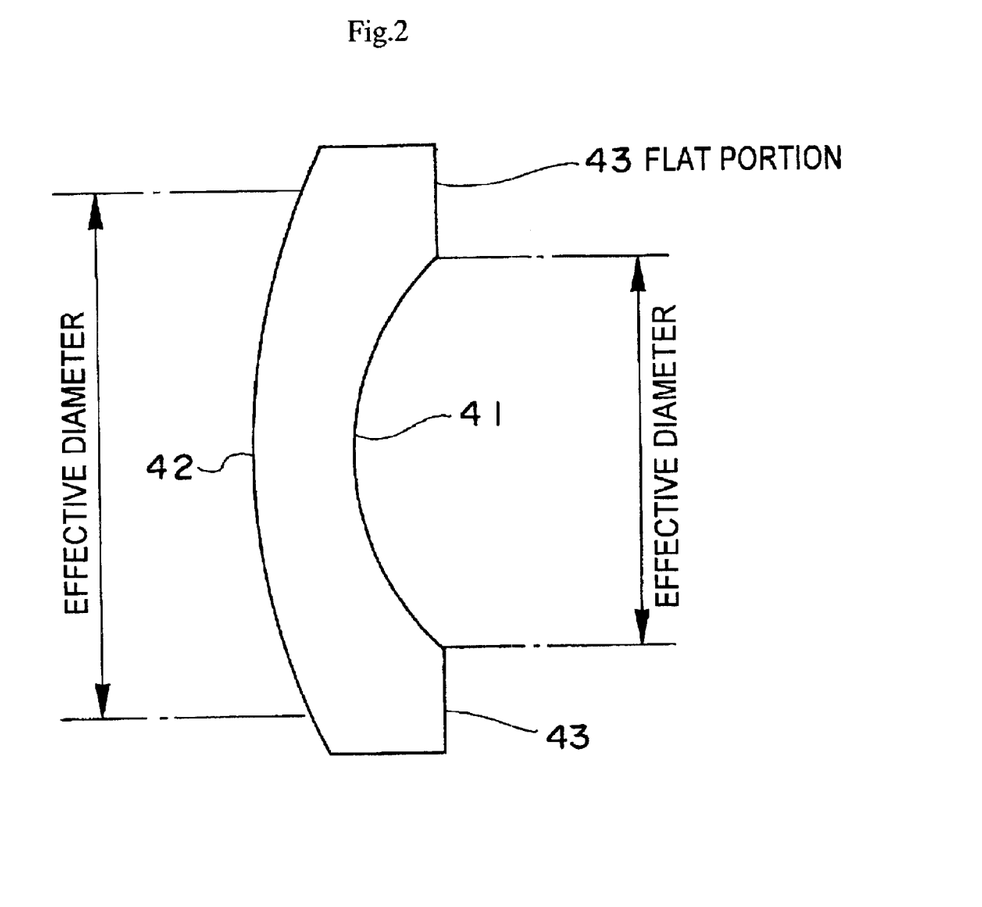
FIG. 2 is a drawing descriptive of a concave meniscus lens in which a flat portion perpendicular to the optical axis is provided on the outside of the optically functional surface.

The concave meniscus lens and double-concave lens that are manufactured by the method of the present invention have optically functional surfaces (optically effective regions) for incorporation into various lens systems. In FIG. 2, for example, the concave surface denoted by 41 is such a surface. In an actual lens, a flat portion 43 perpendicular to the optical axis is provided on the outside of concave surface 41.

In lenses in which one or both surfaces are concave, lessening distortion in the cooling step following press-molding causes deformation in a direction reducing the radius of curvature of the concave surface in lenses in which one surface is concave, and deformation in a direction reducing the radius of curvature of the concave surface with the smaller radius of curvature in lenses in which both surfaces are concave. This is particularly marked in lenses in which the ratio of b/a is 1.5 or greater. However, the same tendency exists even in the molding of lenses in which ratio b/a is less than 1.5; the manufacturing method of the present invention is also effective and advantageous for lenses in which ratio b/a is less than 1.5. Further, although the manufacturing method of the present invention is effective in lenses in which the ratio b/a is 1.5 or greater, the ratio b/a in lenses that are actually employed is up to about 3.5. However, the manufacturing method of the present invention may be employed in the molding of lenses with even higher b/a ratios.

In Manufacturing Method 1 of the present invention, as shown in FIG. 1(A) and (B), one of the surfaces of the lens is either flat or convex. In this case, cooling during the cooling step is conducted so that the temperature $ta2$ of the mold with a convex forming or flat forming molding surface reaches the glass transition temperature Tg of the glass being molded before temperature $ta1$ of the mold with a concave forming molding surface. Preferably, the cooling conditions are set so that temperature $ta1$ is at least 5 degrees centigrade higher than temperature $ta2$ when temperature $ta2$ reaches Tg. In particular, the cooling conditions are set so that temperature $ta1$ is preferably 5 to 40, more preferably 5 to 30, still more preferably 5 to 20 degrees centigrade higher than temperature $ta2$ when temperature $ta2$ reaches Tg.

Further, temperature $ta2$ is lower than temperature $ta1$ at least at the end of the molding step, and more preferably, temperature $ta2$ is at least 5 degree centigrade lower than temperature $ta1$ at the end of the molding step. That is, the temperatures of the forming mold at the end of pressure application are set so that temperature $ta2$ of the mold for forming a flat or convex surface (S1) is at least 5 degree centigrade lower than temperature $ta1$ of the mold for forming a concave surface (S2) ($ta1-ta2 \geq 5$ degree centigrade).

In particular, temperature $ta2$ is preferably lower than temperature $ta1$ from the beginning to the end of the molding step.

Manufacturing Method 2 of the present invention is directed to the case where both surfaces are concave, as shown in FIG. 1(C). In that case, temperature $tb2$ of the mold having the forming surface with the larger radius of curvature reaches Tg before temperature $tb1$ of the mold having the forming surface with the smaller radius of curvature. More preferably, the cooling conditions are set so that $tb1$ is at least 5 degree centigrade higher than temperature $tb2$ when temperature $tb2$ reaches Tg. In particular, the cooling conditions are set so that temperature $tb1$ is preferably 5 to 40, more preferably 5 to 30, still more preferably 5 to 20 degree centigrade higher than temperature $ta2$ when temperature $tb2$ reaches Tg.

Temperature $tb2$ is preferably lower than temperature $tb1$ at least at the end of the molding step, and more preferably, temperature $tb2$ is at least 5 degrees centigrade lower than temperature $tb1$, at least at the end of the molding step. That is, the temperature of the forming mold at the end of pressure application is set so that temperature $tb1$ of the mold for forming the concave surface (S2) with the smaller radius of curvature is at least 5 degrees centigrade higher that temperature $tb2$ of the mold for forming the concave surface (S1) with the larger radius of curvature R($tb1-tb2 \geq 5$ degrees centigrade).

In particular, temperature $tb2$ is preferably lower than temperature $tb1$ from the beginning to the end of the molding step.

Embodiments of the method of manufacturing glass optical elements of the present invention includes (1) a molding step in which a heat-softened glass molding material is press-molded by a forming mold including an upper mold and a lower mold with molding surfaces forming the optically functional surfaces of the glass optical element to be molded, one of these molding surfaces being concave forming and the other being convex forming or flat forming in Manufacturing Method 1, and both of these molding surfaces being concave forming in Manufacturing Method 2, thereby transferring shapes of the molding surfaces to the glass material being molded; (2) a cooling step in which the forming mold is cooled to cool the molded glass below the glass transition temperature (Tg) of the glass; and (3) a removal step in which the cooled glass is removed from the forming mold.

The press-molding of a glass optical element (for example, a glass lens) is characterized by the use of a forming mold comprising an upper mold and a lower mold with molding surfaces for forming the optically functional surfaces of the glass optical element, and in that a prescribed difference in temperature is imparted between the upper mold and the lower mold by a prescribed time of the press-molding and cooling steps; known methods may be employed without alteration for the other steps and conditions. In the precision pressing of molding a glass article, a glass lens material such as a glass preform or a glass gob is supplied to a forming mold having an upper mold and a lower mold with opposing molding surfaces corresponding to the shape of the lens; press-molding is performed at prescribed pressure and for a prescribed time; both the forming mold and the molded product are cooled either at the start of press-molding, part way through press-molding, or at the end of press-molding; and after cooling to a prescribed temperature, the molded product is removed from the forming mold. The temperature conditions of the glass lens material and forming mold when the glass lens material is supplied to the forming mold and during press-molding can be suitably determined in view of the lens material, shape, dimensions, and the like.

In the present invention, the temperature of the forming mold is preferably adjusted so that $t1-t2 \geq 5$ degree centigrade at the end of the initial application of pressure. In forming mold having $t1$ and $t2$, these temperatures may correspond to either the upper mold or the lower mold, respectively. However, to facilitate molding and centering of the glass material on a mold, when molding a lens, one of the surfaces of which is flat or convex, the mold forming the flat or convex surface (S1) is desirably the lower mold, and the mold forming the concave surface (S2) is desirably the upper mold. Further, when molding a lens, both surfaces of which are concave, the mold forming the concave surface (S1) with the larger radius of curvature R is desirably the lower mold and the mold forming the concave surface (S2) with the smaller radius of curvature R is the upper mold.

In the preferred embodiments of the present invention, the difference in temperature ($t1-t2$) between the upper and lower molds is set to be 5 degree centigrade, at least at the end of the initial application of pressure. Here, the term "initial application of pressure" means the application of pressure used to mold the glass lens material into the shape corresponding to the molding surfaces of the forming mold. In the manufacturing method of the present invention, pressure (for example, the weight of the upper mold itself) may be further applied to the molded product after the initial application of pressure, or the molded product may be cooled without applying pressure after the initial application of pressure. However, pressure such as pressure resulting from the weight of the upper mold itself is preferably continuously applied to the molded product until the glass is removed from the mold.

Figure 3:
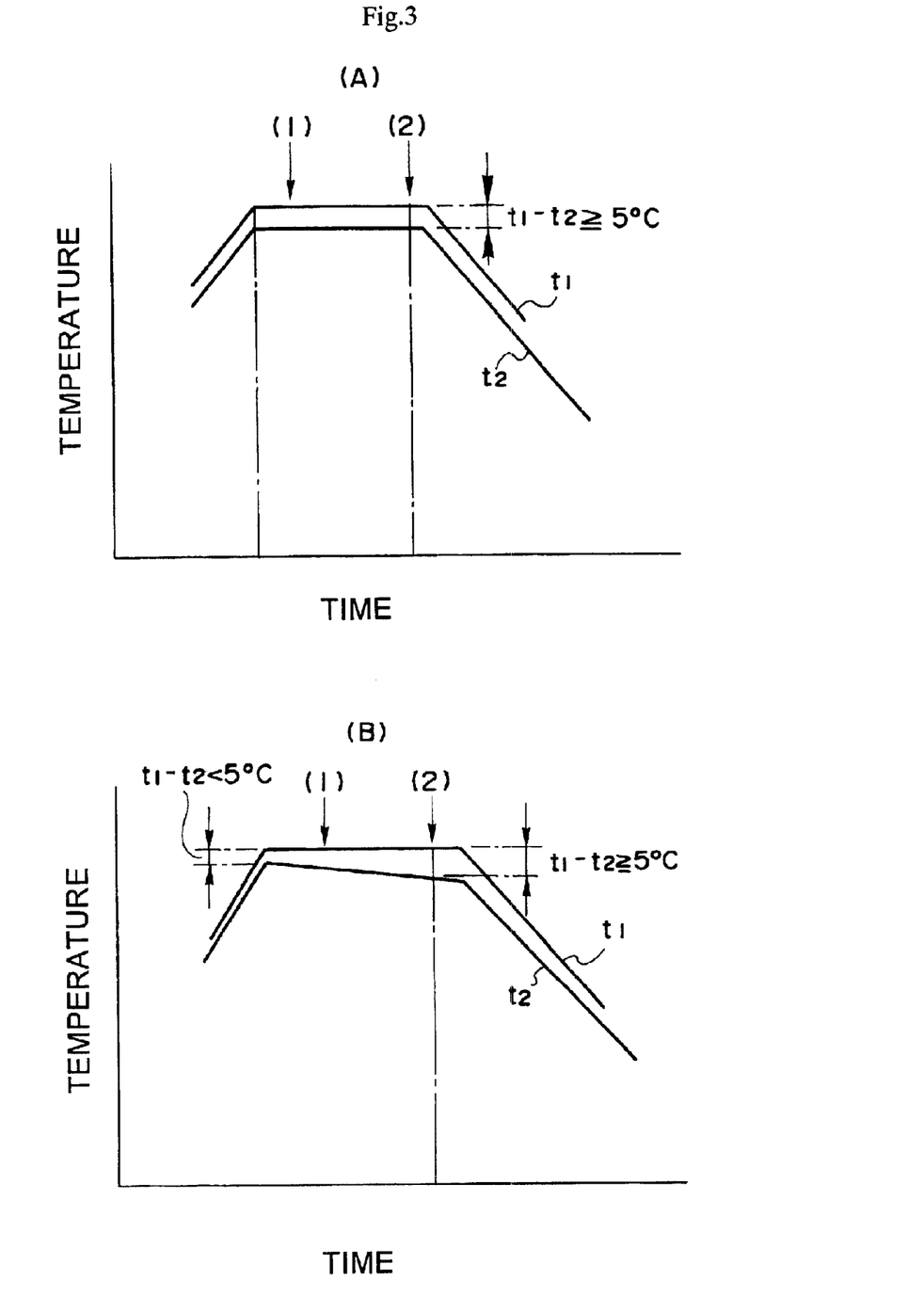
FIG. 3 shows typical changes over time in the temperatures of the two molds (upper mold, lower mold) in the manufacturing method of the present invention.

The difference in temperature for example, ($t1-t2 \geq 5$ degrees centigrade) in the upper and lower two molds may be applied from the start of pressure application for molding, for example. Specifically, the upper mold and the lower mold are heated under different heating conditions. This state is shown in FIG. 3(A). In the figure, (1) is the start of press-molding and (2) is the end of the initial application of pressure. In FIG. 3(A), the condition ($t1-t2 \geq 5$ degrees centigrade) is already satisfied at the start of press-molding (1). Even when the condition ($t1-t2 \geq 5$ degrees centigrade) is not satisfied at the start of pressure application for molding, the temperature of the forming mold can be controlled during pressure application for molding so that satisfying ($t1-t2$)$\geq 5$ degrees centigrade. In that case, for example, the mold of temperature $t2$ could be aggressively cooled to achieve ($t1-t2$)$\geq 5$ degrees centigrade during the application of pressure for molding. FIG. 3(B) shows that state. In this figure, as well, (1) denotes the start of press-molding and (2) denotes the end of the initial application of pressure. In FIG. 3(B), at the start of press-molding (1), the temperature difference satisfies $t1-t2<5$ degrees centigrade and then the mold of temperature $t2$ is aggressively cooled so that ($t1-t2 \geq 5$ degrees centigrade) is satisfied at the end of the initial application of pressure (2). In FIG. 3(B), the temperature difference can be $t1=t2$ at point (1) and then temperature adjustment can be made to satisfy ($t1-t2$ 5 degrees centigrade) at the end of initial application of pressure (2).

In one of the preferred embodiments, so long as the temperature difference ($t1-t2$) between the upper and lower molds is at least 5 degrees centigrade at the end of the initial application of pressure, glass optical elements (for example, lenses) can be obtained with little distortion and good surface precision. In that case, the temperature difference ($t1-t2$) in the two molds preferably falls within the range of from 10–20 degrees centigrade at least at the end of the initial application of pressure.

In the method of the present invention, from the perspective of reducing nonuniformity in glass contraction resulting from the cooling step following application of pressure and from the perspective of reducing the amount of distortion, desirable is cooling in such a manner that the temperature difference ($t1-t2$) between the two molds becomes at least 5 degrees centigrade before the temperature of the mold forming the flat or convex surface, or the mold forming the concave surface with the larger radius of curvature R, reaches Tg.

The initial application of pressure in the molding step of the manufacturing method of the present invention can be conducted at $294 \times 10^4$–$3,432 \times 10^4$ Pa for a period of 30–300 sec. Further, in the cooling step, secondary pressure application can be conducted (a secondary application of pressure being desirable), with the secondary application of pressure being conducted at $196 \times 10^4$–$2,450 \times 10^4$ Pa for a period of, for example, 30–300 sec. The pressure applied in the secondary application is preferably smaller than that in the initial application. Secondary pressure application is desirably conducted immediately following initial pressure application, and is preferably conducted until the glass temperature reaches a temperature about 50° C. lower than the Tg of the glass. Further, in the manufacturing method of the present invention, in the period following secondary pressure application through when the molded glass is removed from the mold, a final pressure application can be conducted at $0.0098 \times 10^4$–$4.9 \times 10^4$ Pa.

EXAMPLES

The present invention is described in detail below through Examples.

Figure 4:
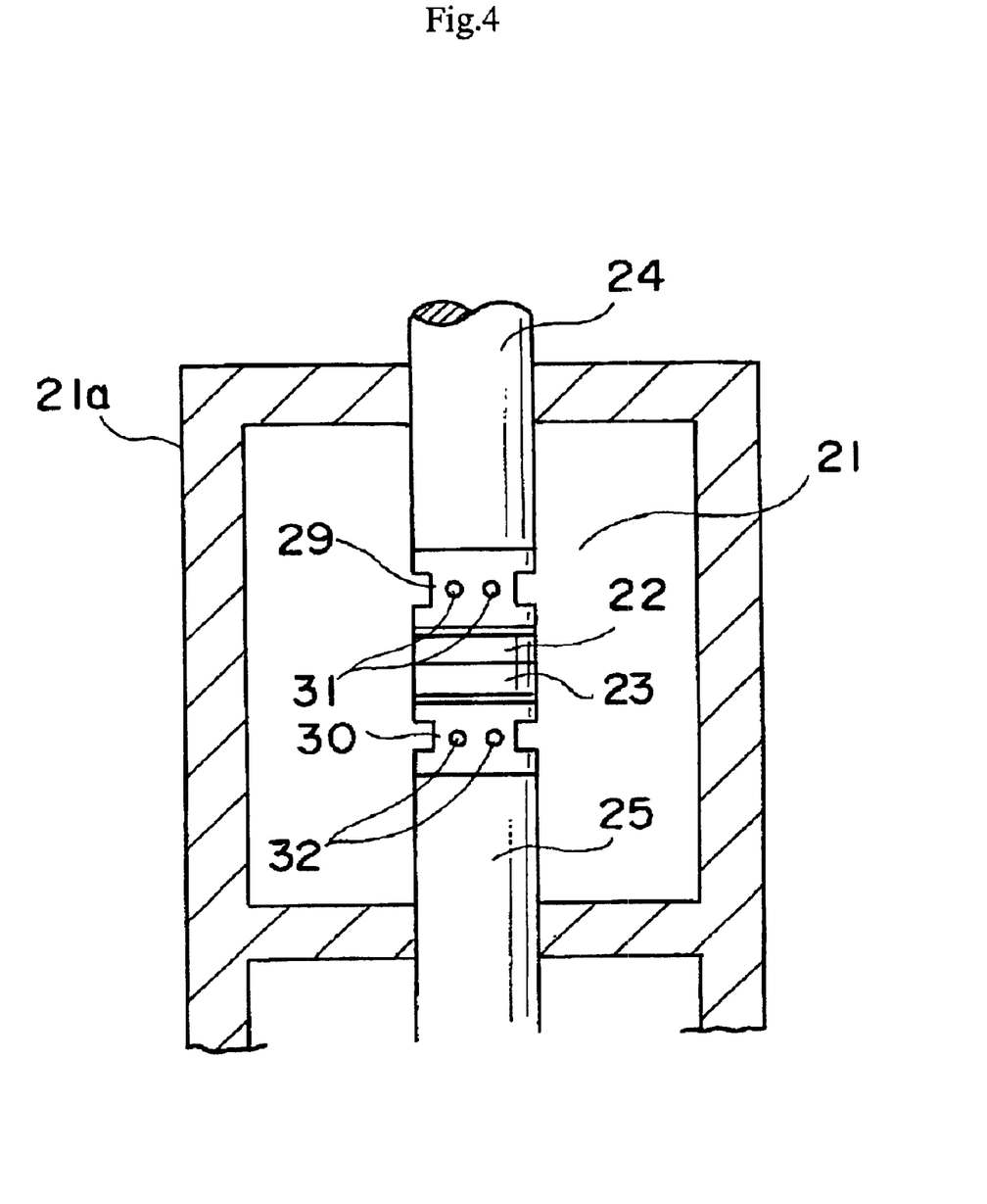
FIG. 4 is a schematic diagram of the molding device employed in Examples 1–3 and Comparative Examples 1 and 2.

The molding device shown in FIG. 4 was employed in Examples 1–3 and Comparative Examples 1 and 2 below. In the molding device shown in FIG. 4, an upper mold 22 and a lower mold 23 are disposed within a hot molding chamber 21 sealed within a housing 21a. Upper mold 22 and lower mold 23 are secured through adiabatic bases 29 and 30 to the front ends of upper fixed shaft 24 and lower movable shaft 25, respectively. Lower movable shaft 25 is linked to a pressure cylinder, not shown, by which it is driven upward during pressure application.

In each of the Examples and comparative examples, an initial pressure of $588 \times 10^4$ Pa was applied for 2 min and a secondary pressure of $294 \times 10^4$ Pa was applied for 3 min.

Further, adiabatic bases 29 and 30 have cooling gas outlets 31 and 32, respectively, for independently cooling upper mold 22 and lower mold 23. The supply of gas can be independently controlled above and below, permitting change in the cooling rates of upper mold 22 and lower mold 23. An inert gas was employed as the cooling gas.

Example 1

Figure 5:
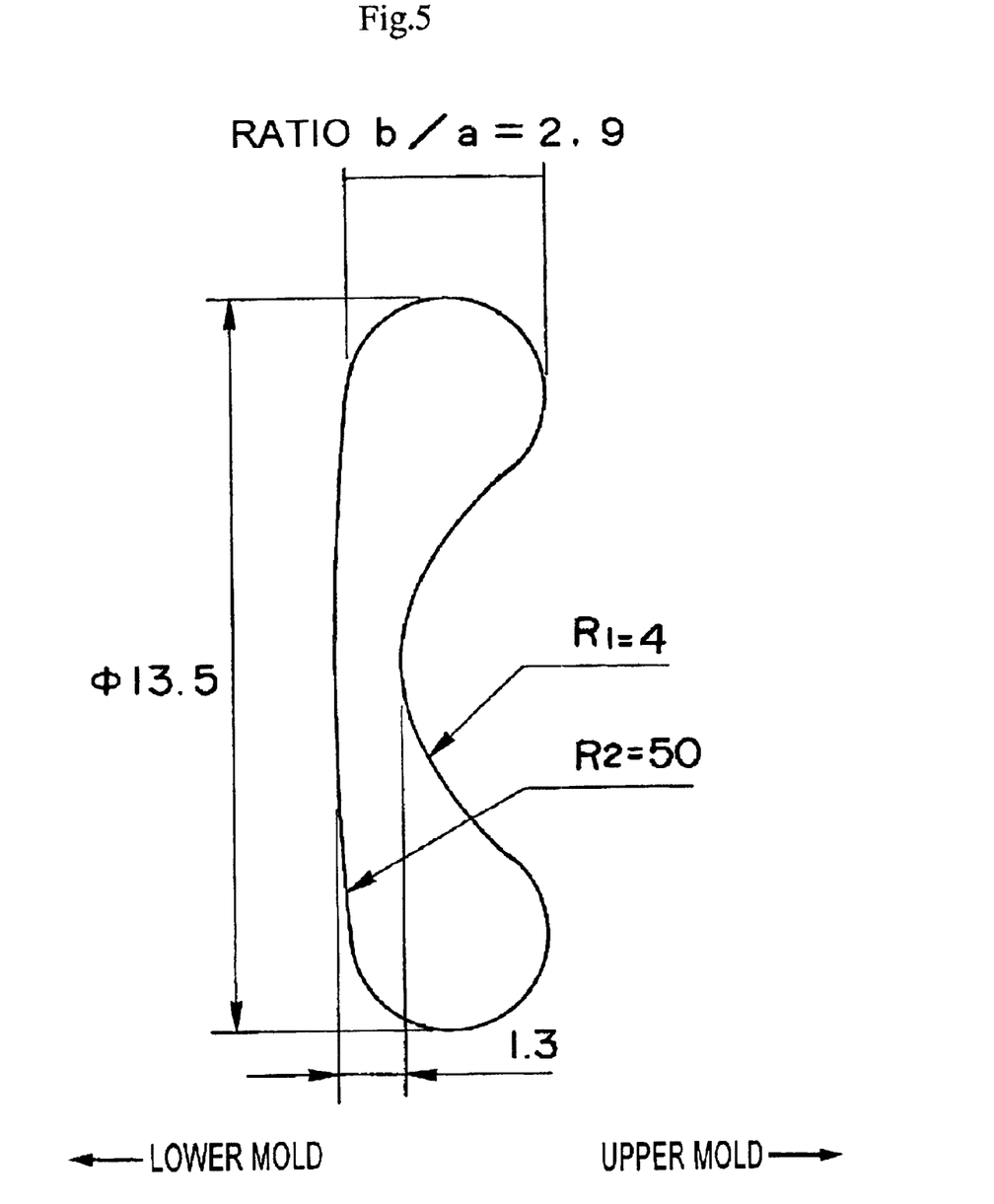
FIG. 5 is a descriptive drawing of the glass lens manufactured in Example 1.

The glass lens (ratio b/a=2.9, concave meniscus) of the shape shown in FIG. 5, one surface of which was concave (radius of curvature R=4 mm) and the other side of which was convex (radius of curvature R=50 mm) was manufactured. The concave surface was formed with the upper mold and the convex surface with the lower mold. NbFD13 (Tg=535 degree centigrade, Ts=570 degree centigrade) was employed as the glass material. The molding conditions are given in Table 1.

Figure 8:
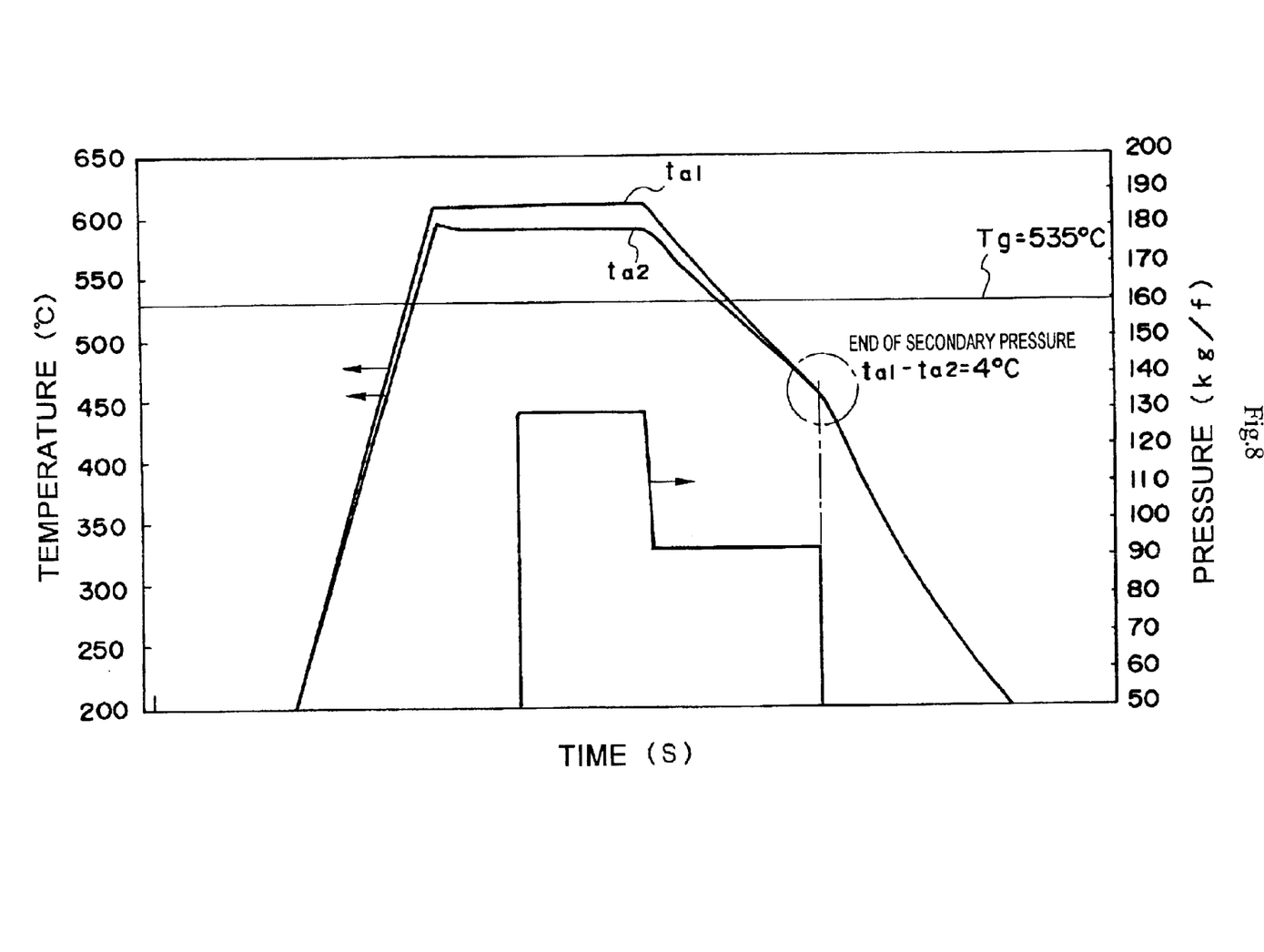
FIG. 8 shows change over time in the temperature of the upper mold (Concave forming surface), temperature of the lower mold (convex forming surface), and pressure applied in Example 1.

The upper mold (concave forming surface) temperature, lower mold (convex forming surface) temperature, and various changes in pressure applied over time are shown in FIG. 8. The temperature (ta1) of the upper mold (concave forming surface) was 610 degrees centigrade and the temperature (ta2) of the lower mold (convex forming surface) was 590 degrees centigrade at the start of press-molding, with a difference in temperature between the two being 20 degrees centigrade. During press-molding, these temperatures were maintained; the temperature (ta1) of the upper mold was also 610 degrees centigrade and the temperature (ta2) of the lower mold was also 590 degrees centigrade at the end of the initial application of pressure, with a difference in temperature between the two of 20 degrees centigrade. Cooling progressed, and the temperature (ta1) of the upper mold when the temperature (ta2) of the lower mold reached the glass material Tg of 535 degrees centigrade was 545 degrees centigrade, with a difference in temperature between the two of 10 degrees centigrade. Further, the difference between temperature (ta2) of the lower mold and temperature (ta1) of the upper mold at the end of second pressure application was 4 degrees centigrade.

Example 2

Figure 6:
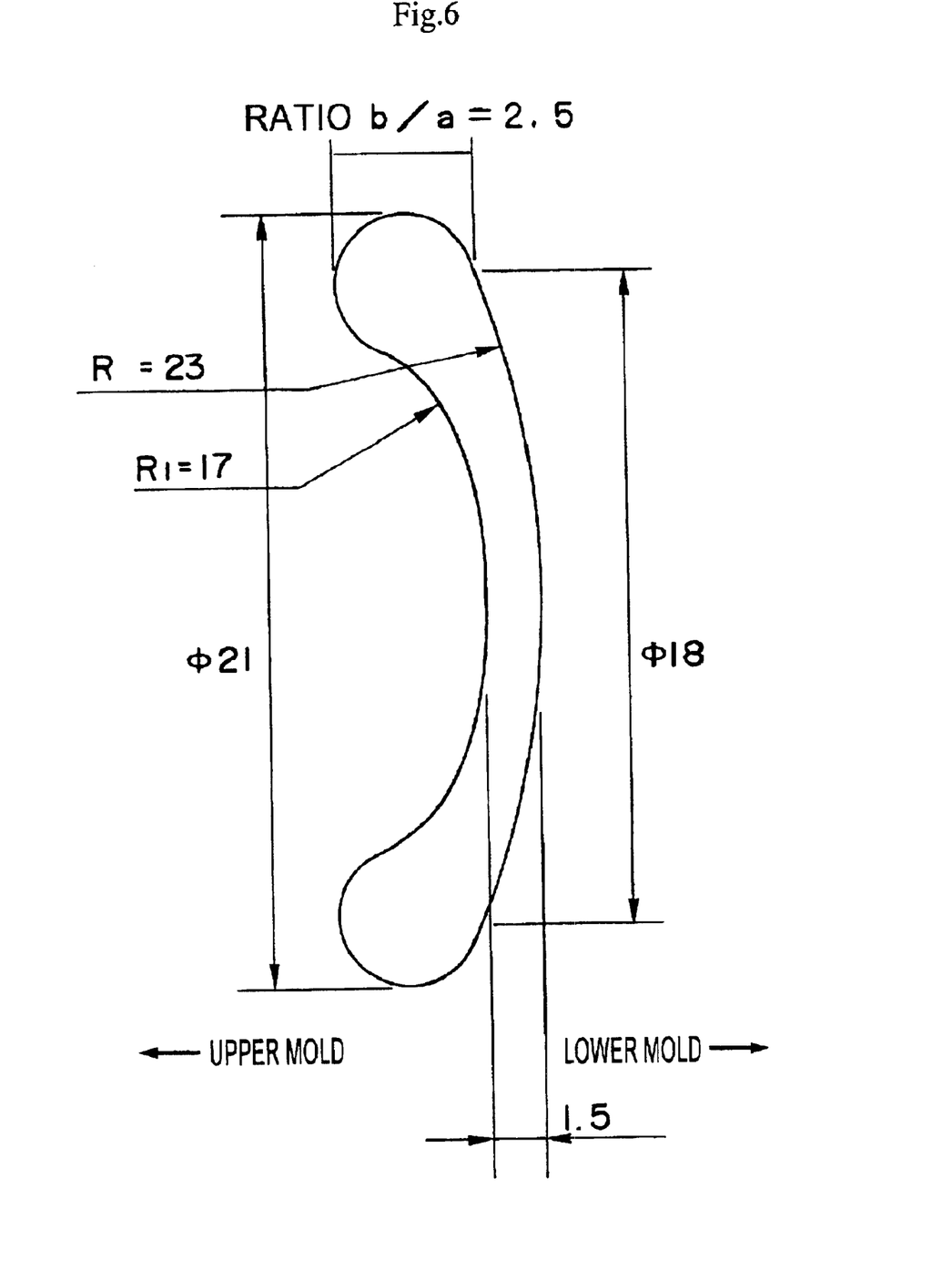
FIG. 6 is a descriptive drawing of the glass lens manufactured in Example 2.

The glass lens (ratio b/a=2.5, concave meniscus lens) of the shape shown in FIG. 6, one surface of which was concave (radius of curvature R=17 mm) and the other surface of which was convex (radius of curvature R=23 mm) was manufactured. The concave surface was formed with the upper mold and the convex surface with the lower mold. LaC13 (Tg=520 degrees centigrade, Ts=560 degrees centigrade) was employed as the glass material. The molding conditions are given in Table 1.

Figure 9:
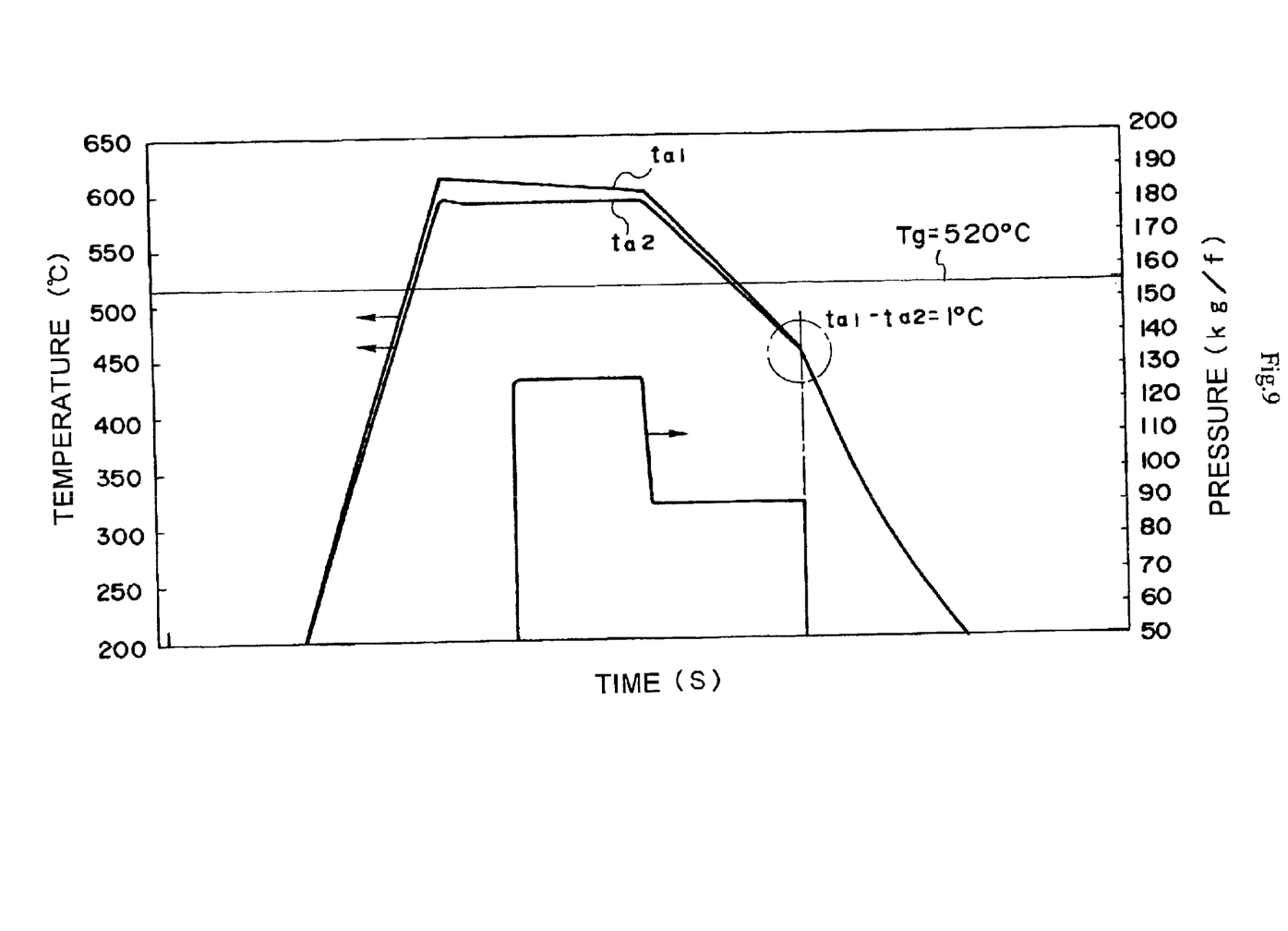
FIG. 9 shows change over time in the temperature of the upper mold (concave forming surface), temperature of the lower mold (convex forming surface), and pressure applied in Example 2.

The temperature of the upper mold (concave forming surface), the temperature of the lower mold (convex forming surface), and the various changes in pressure applied over time are given in FIG. 9. The temperature (ta1) of the upper mold (concave forming surface) was 600 degrees centigrade and the temperature (ta2) of the lower mold (convex forming surface) was 580 degrees centigrade at the start of press-molding, with difference in temperature between the two of 20 degrees centigrade. During press-molding, the temperature (ta1) of the upper mold was gradually decreased, The temperature (ta1) of the upper mold was 590 degrees centigrade and the temperature (ta2) of the lower mold was 580 degrees centigrade, with a difference in temperature between the two of 10° C., at the end of the initial application of pressure. Cooling progressed, and the temperature (ta1) of the upper mold when the temperature (ta2) of the lower mold reached the glass material Tg of 520 degrees centigrade was 528 degrees centigrade, with a difference in temperature between the two of 8 degrees centigrade. Further, the difference between temperature (ta2) of the lower mold and temperature (ta1) of the upper mold at the end of second pressure application was 1 degree centigrade.

Example 3

Figure 7:
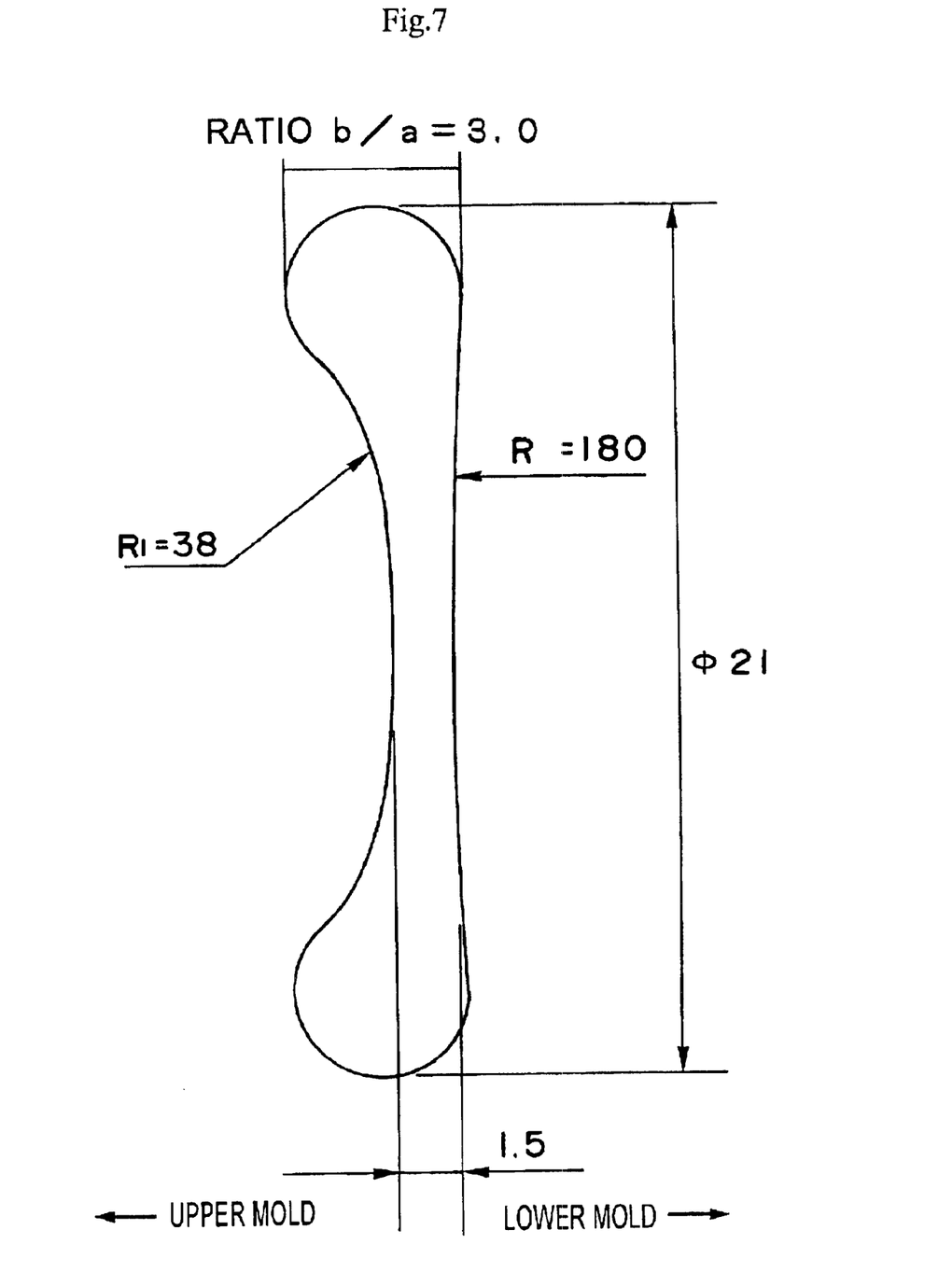
FIG. 7 is a descriptive drawing of the glass lens manufactured in Example 3.

The glass lens (ratio b/a=3.0, double-concave lens) of the shape shown in FIG. 7, one surface of which was concave (radius of curvature R=38 mm) and the other surface of which was also concave (radius of curvature R=180 mm) was manufactured. The concave surface with the smaller R was formed with the upper mold and the concave surface with the greater R was formed with the lower mold. LaC13 (Tg=520 degrees centigrade Ts=560 degrees centigrade) was employed as the glass material. The molding conditions are given in Table 1.

Figure 10:
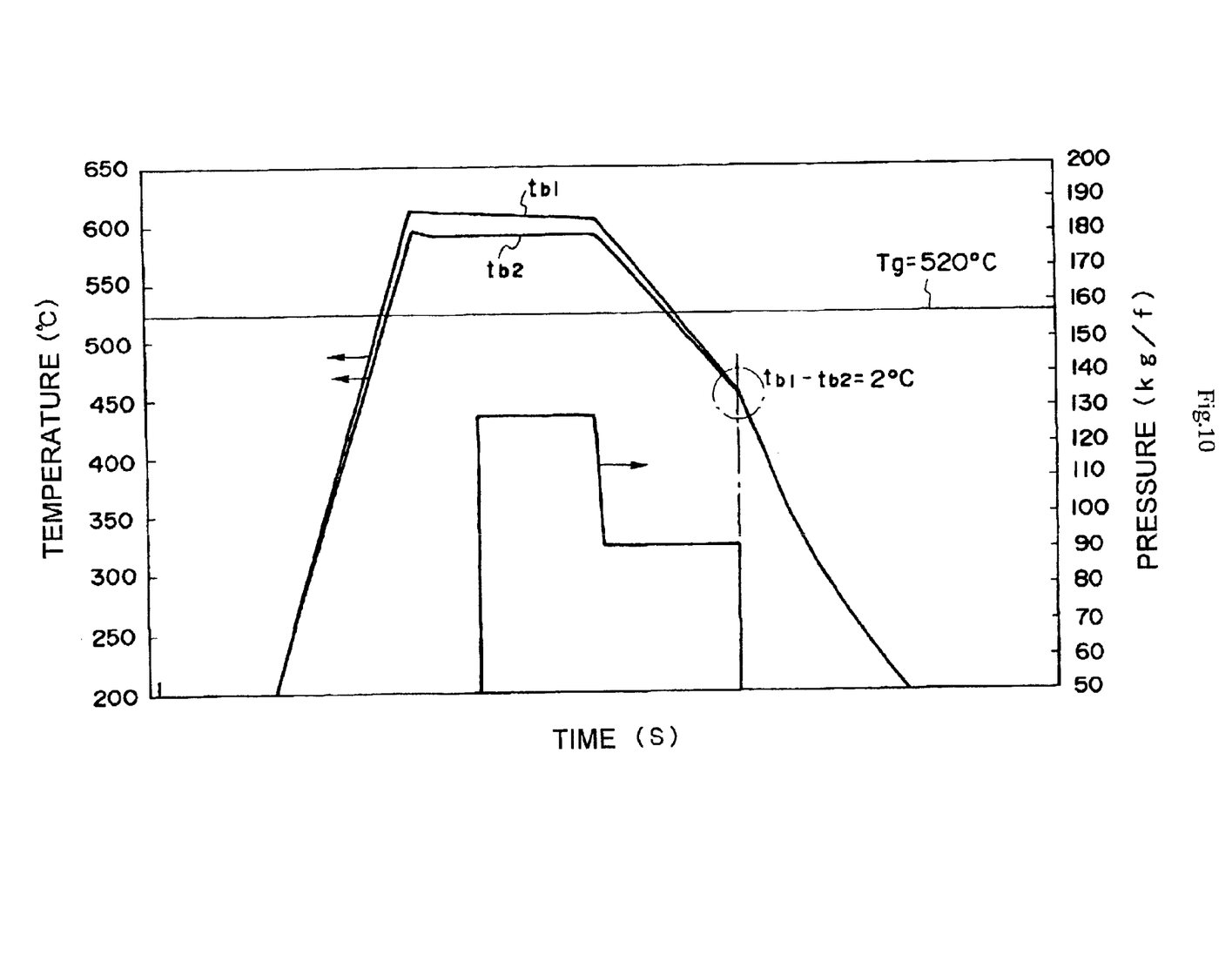
FIG. 10 shows change over time in the temperature of the upper mold (concave forming surface), temperature of the lower mold (convex forming surface), and pressure applied in Example 3.

The temperature of the upper mold (smaller R concave forming surface), the temperature of the lower mold (greater R concave forming surface), and the various changes in pressure applied over time are given in FIG. 10. The temperature (tb1) of the upper mold was 600 degrees centigrade and the temperature (tb2) of the lower mold was 580 degrees centigrade at the start of press-molding, with a difference in temperature between the two of 20 degrees centigrade. During press-molding, the temperature (tb1) of the upper mold was gradually decreased. The temperature (tb1) of the upper mold was 595 degree centigrade and the temperature (tb2) of the lower mold was 580 degrees centigrade, with a difference in temperature between the two of 15 degrees centigrade, at the end of the initial application of pressure. Cooling progressed, and the temperature (tb1) of the upper mold when the temperature (tb2) of the lower mold reached the glass material Tg of 520 degrees centigrade was 530 degrees centigrade, with a difference in temperature between the two of 10 degrees centigrade. Further, the difference between temperature (tb2) of the lower mold and temperature (tb1) of the upper mold at the end of second pressure application was 2 degrees centigrade.

Comparative Example 1

With the exception that the temperatures of the upper and lower molds given in Table 1 were made identical, a glass lens was formed in the same manner as in Example 1. The temperature of the upper mold (concave forming surface), lower mold (convex forming surface), and various changes in pressure applied over time are given in FIG. 11.

Figure 11:
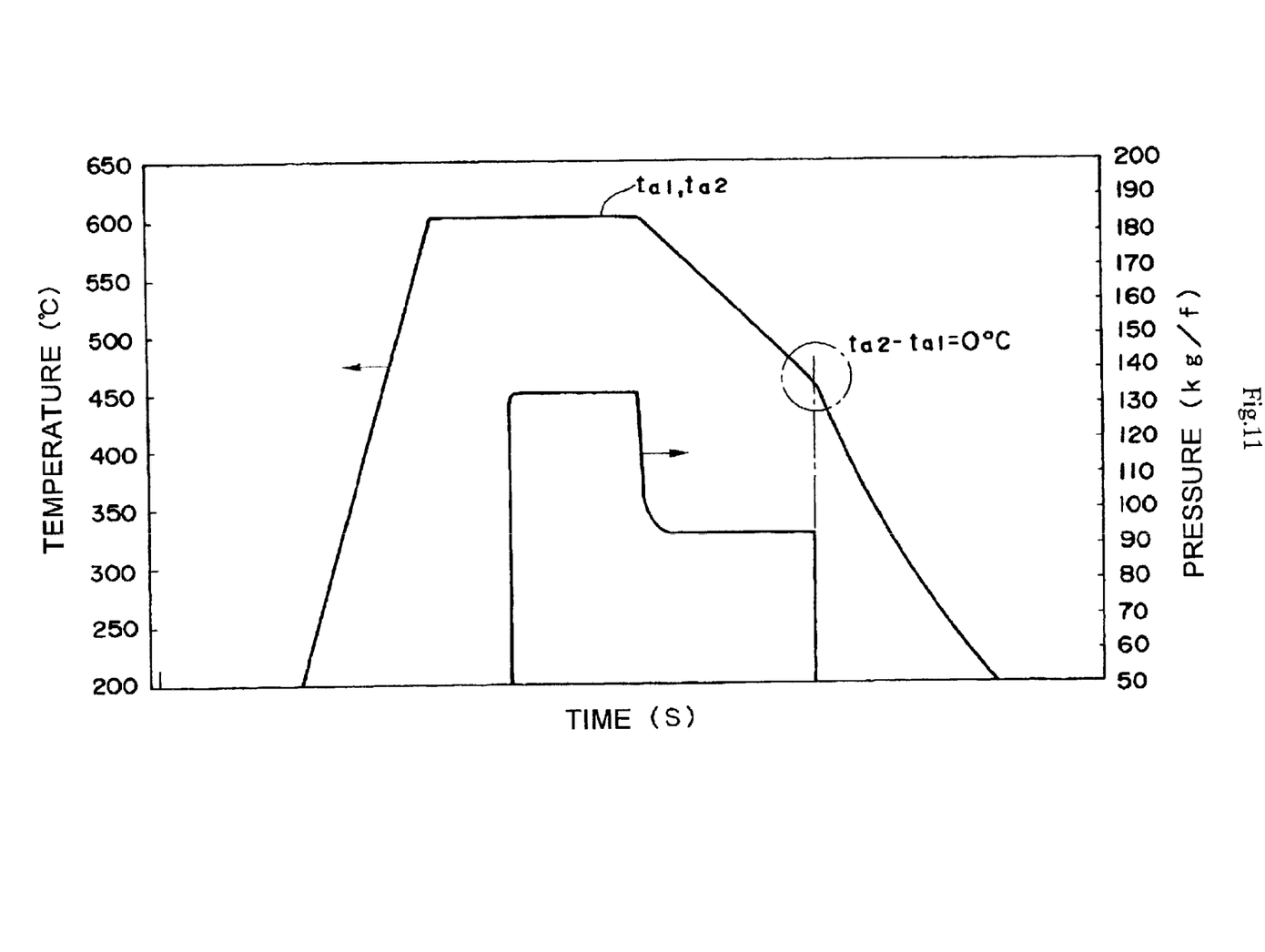
FIG. 11 shows change over time in the temperature of the upper mold (concave forming surface), temperature of the lower mold (convex forming surface), and pressure applied in Comparative Example 1.

The temperature (ta1) of the upper mold was 600 degrees centigrade and the temperature (ta2) of the lower mold was al 600 degrees centigrade at the start of press-molding, with the difference in temperature between the two being 0 degrees centigrade. During press-molding, these temperatures were maintained; the temperature (ta1) of the upper mold was also 600 degrees centigrade and the temperature (ta2) of the lower mold was also 600 degrees centigrade at the end of the initial application of pressure, with difference in temperature between the two of 0 degrees centigrade degree centigrade. Cooling progressed, and the temperature (ta1) of the upper mold when the temperature (ta2) of the Lower mold reached the glass material Tg of 535 degrees centigrade was 535 degrees centigrade, with a difference in temperature between the two of 0 degrees centigrade. Further, the difference between temperature (ta2) of the lower mold and temperature (ta1) of the upper mold at the end of second pressure application was 0 degrees centigrade.

Comparative Example 2

Figure 12:
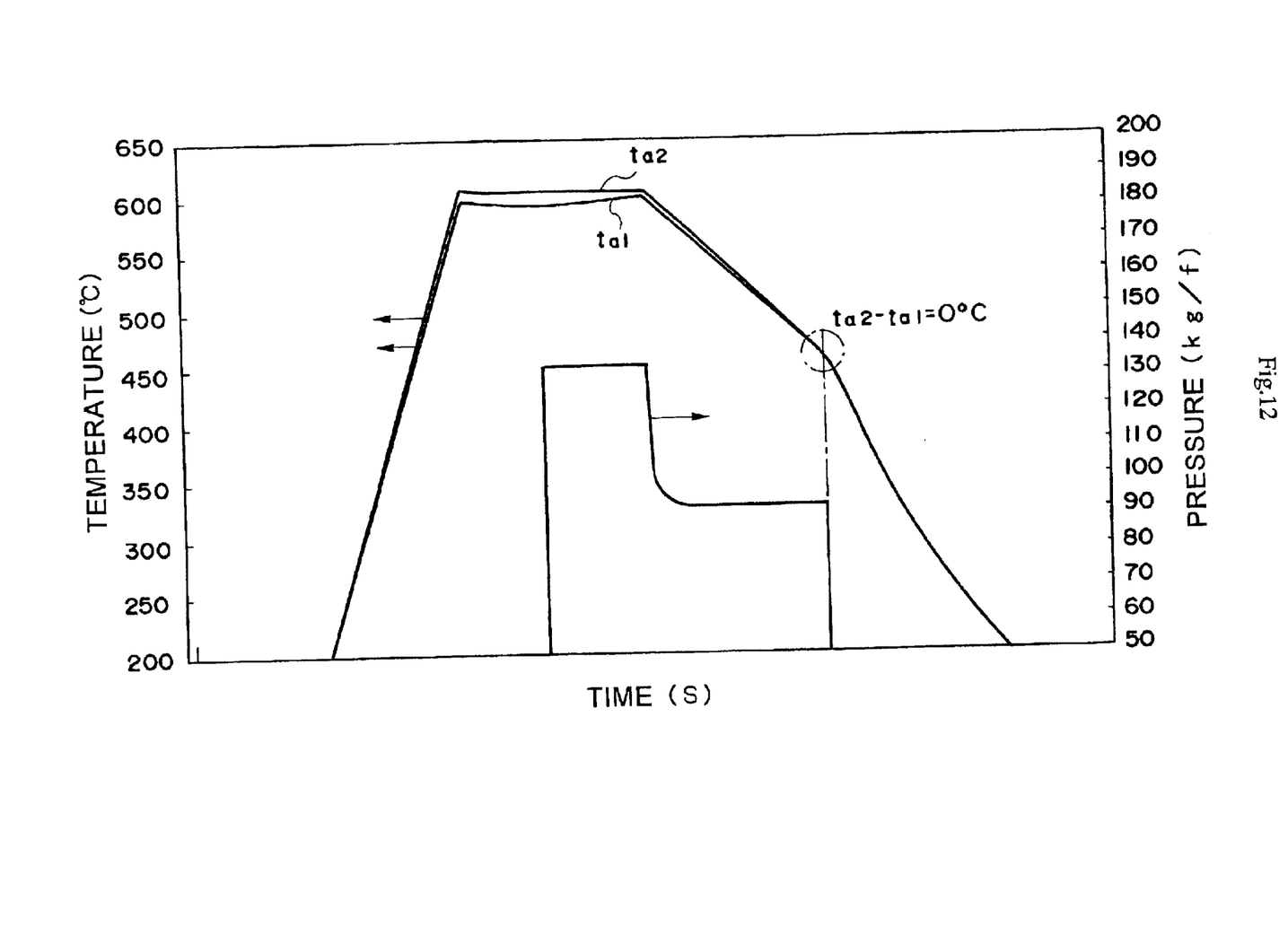
FIG. 12 shows change over time in the temperature of the upper mold (concave forming surface), temperature of the lower mold (convex forming surface), and pressure applied in Comparative Example 2.

With the exception that the temperature of the upper mold (concave forming surface) was made lower than the temperature of the lower mold (convex forming surface) as shown in Table 1, a glass lens was molded in the same manner as in Example 1. The upper mold temperature, lower mold temperature, and various changes in pressure applied over time are shown in FIG. 12. The temperature (ta1) of the upper mold was 595 degrees centigrade and the temperature (ta2) of the lower mold was 605 degrees centigrade at the start of press-molding, with the difference in temperature between the two being −10 degrees centigrade. During press-molding, the temperature (ta1) of the upper mold was gradually increased. The temperature (ta1) of the upper mold was 600 degrees centigrade and the temperature (ta2) of the lower mold was 605 degrees centigrade at the end of the initial application of pressure, with a difference in temperature between the two of −5 degrees centigrade. Cooling progressed, and the temperature (ta1) of the upper mold when the temperature (ta2) of the lower mold reached the glass material Tg of 535 degrees centigrade was 533 degrees centigrade, with a difference in temperature between the two of −2. Further, the difference between temperature (ta2) of the lower mold and temperature (ta1) of the upper mold at the end of second pressure application was 0 degrees centigrade.

Figure 13:
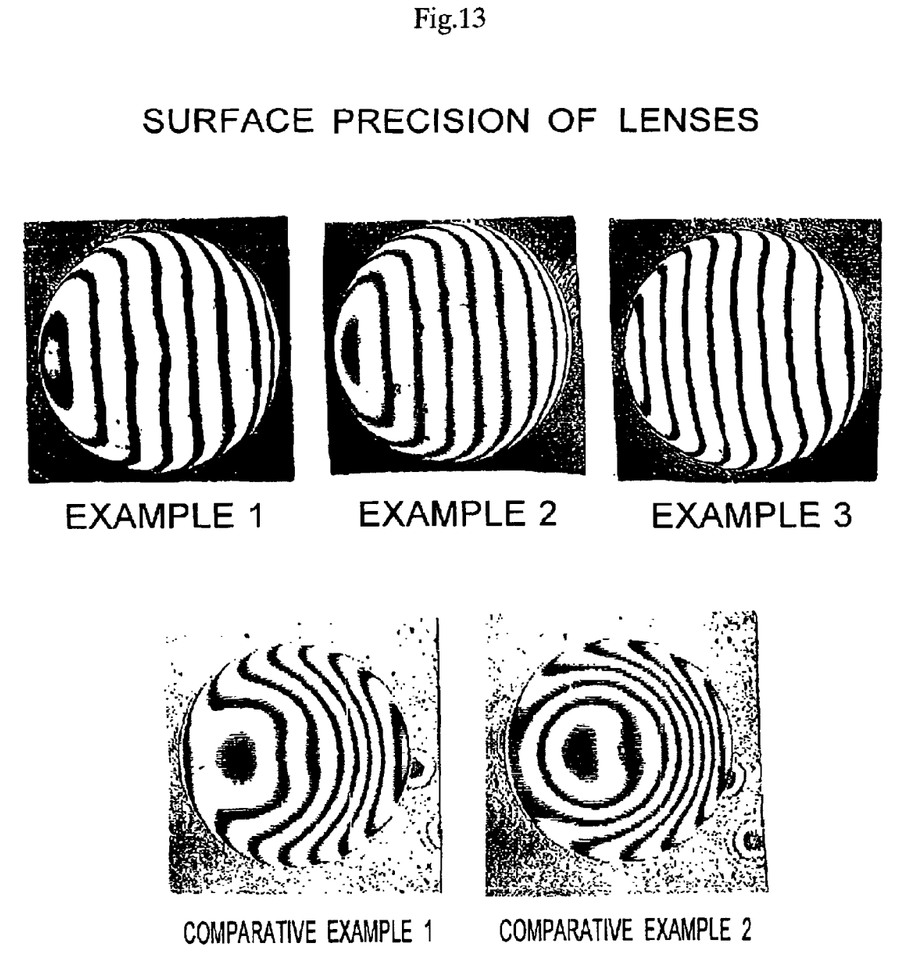
FIG. 13 shows the degree of surface precision of the glass lenses obtain in Example 1–3 and Comparative Example 1 and 2.

The degrees of surface precision of the glass lenses of Examples 1–3 and Comparative Examples 1 and 2 are given in FIG. 13. An evaluation of "good" in the degree of surface precision of Table 1 means that no "astigma or irregularity" were seen in an interference pattern within the effective diameter (optical effective diameter: about 80 percent of the region projected in the interference pattern comprises the effective diameter).

As shown in Table 1, increasing the upper mold (concave forming surface) temperature above the lower mold (convex forming surface) temperature so that temperature ta2 of the mold with a convex forming surface or flat forming surface reached Tg before temperature ta1 of the mold with a concave forming surface, yielded glass optical elements having good surface precision.

The method of the present invention provides glass lenses with high surface precision, in which one or two surfaces are concave, even in lenses in which the ratio b/a of the peripheral thickness b to the center thickness a is 2 or greater.

The present disclosure relates to the subject matter contained in Japanese Patent Application No. 2000-265293 filed on Sep. 1, 2000, which is expressly incorporated herein by reference in its entirety.

What is claimed is:

1. A method for manufacturing a glass optical element having at least one concave surface with no grinding or polishing, comprising:
    softening a glass molding material by heating,
    molding the softened material with a first mold having a first molding surface and a second mold having a second molding surface by applying a pressure, the first molding surface comprising a first concave forming surface, the second molding surface comprising one of a convex forming surface, a planar forming surface and a second concave forming surface, the second concave forming surface having a curvature radius greater than that of said first concave surface,
    whereby the applying of the pressure starts when the first mold and the second mold are at temperatures above a glass transition temperature of said glass molding material,
    cooling the first mold and the second mold so that temperatures of the first mold and the second mold reach temperatures equal to or lower than the glass transition temperature, and
    removing the cooled glass from either of said first mold or said second mold,
    wherein during the cooling, a second temperature of said second mold reaches the glass transition temperature prior to a time when a first temperature of said first mold reaches the glass transition temperature.

2. The method of claim 1 wherein said first mold comprises an upper mold and said second mold comprises a lower mold.

3. The method of claim 2 wherein when the second temperature of the second mold reaches the glass transition temperature, the first temperature is at least 5 degrees centigrade higher than the glass transition temperature.

TABLE 1

| Temp(° C.) | At the start of press-molding | | | At the end of the initial application | | | At Tg | Surface precision |
|---|---|---|---|---|---|---|---|---|
| | t1 | t2 | Δt | t1 | t2 | Δt | Δt | |
| Ex.1 | 610 | 590 | 20 | 610 | 590 | 20 | 10° C. | Good |
| Ex.2 | 600 | 580 | 20 | 590 | 580 | 10 | 8° C. | Good |
| Ex.3 | 600 | 580 | 20 | 595 | 580 | 15 | 10° C. | Good |
| C.Ex.1 | 600 | 600 | 0 | 600 | 600 | 0 | 0° C. | Bad |
| C.Ex.2 | 595 | 605 | −10 | 600 | 605 | −5 | −2° C. | Bad |

4. The method of claim 3 wherein when the second temperature reaches the glass transition temperature, the first temperature is 5 degrees to 40 degrees centigrade higher than the glass transition temperature.

5. The method of claim 4 wherein when the second temperature reaches the glass transition temperature, the first temperature is 5 degrees to 30 degrees centigrade higher than the glass transition temperature.

6. The method of claim 5 wherein when the second temperature reaches the glass transition temperature, the first temperature is 5 degrees to 20 degrees centigrade higher than the glass transition temperature.

7. The method of claim 2 wherein the second temperature of the second mold is lower than the first temperature of the first mold at the end of the molding step.

8. The method of claim 7 wherein the second temperature of the second mold is at least 5 degrees centigrade lower than the first temperature of the first mold at the end of the molding step.

9. The method of claim 8 wherein the second temperature of said second mold is 5 to 40 degrees centigrade lower than the first temperature of said first mold at the end of the molding step.

10. The method of claim 9 wherein the second temperature of said second mold is 5 to 30 degrees centigrade lower than the first temperature of said first mold at the end of the molding step.

11. The method of claim 10 wherein the second temperature of said second mold is 5 to 20 degrees centigrade lower than the first temperature of said first mold at the end of the molding step.

12. The method of claim 7 wherein the second temperature of said second molding surface is lower than the first temperature of said first mold throughout the molding step.

13. The method of claim 12 wherein the difference between the second temperature and the first temperature becomes gradually smaller in the molding step.

14. The method of claim 2 wherein an initial pressure is applied and, a secondary pressure which is smaller than the initial pressure is applied following the application of the initial pressure.

15. The method of claim 2 wherein b/a is at least 1.5 where a is a center thickness of the glass optical element and b is a peripheral thickness of the glass optical element.

16. The method of claim 2 wherein the second molding surface comprises a second concave forming surface having a curvature radius greater than that of the first concave forming surface.

17. The method of claim 3 wherein the second temperature of said second mold is lower than the first temperature of said first mold throughout molding step.

18. The method of claim 6 wherein the second temperature of said second mold is lower than the first temperature of said first mold throughout the molding step.

19. The method of claim 18 wherein an initial pressure is applied and, a secondary pressure which is smaller than the initial pressure is applied following the application of the initial pressure.

20. The method of claim 12 wherein the second temperature is kept at least 5 degrees centigrade lower than the first temperature at least up to when the second temperature reaches the glass transition temperature.

21. The method of claim 2 wherein both of the first temperature of the first mold and the second temperature of the second mold below the glass transition temperature when the pressure application is ended.

22. The method of claim 2 wherein the glass optical element has one concave surface and one convex surface, and the radius of curvature of the concave surface is smaller than the radius of curvature of the convex surface.

23. The method of claim 14 wherein the application of the initial pressure lasts for a period of 30 to 300 seconds.

24. The method of claim 2 wherein the cooling rate of the first mold and the second mold is controlled by an inert cooling gas.

* * * * *